United States Patent Office 3,231,573
Patented Jan. 25, 1966

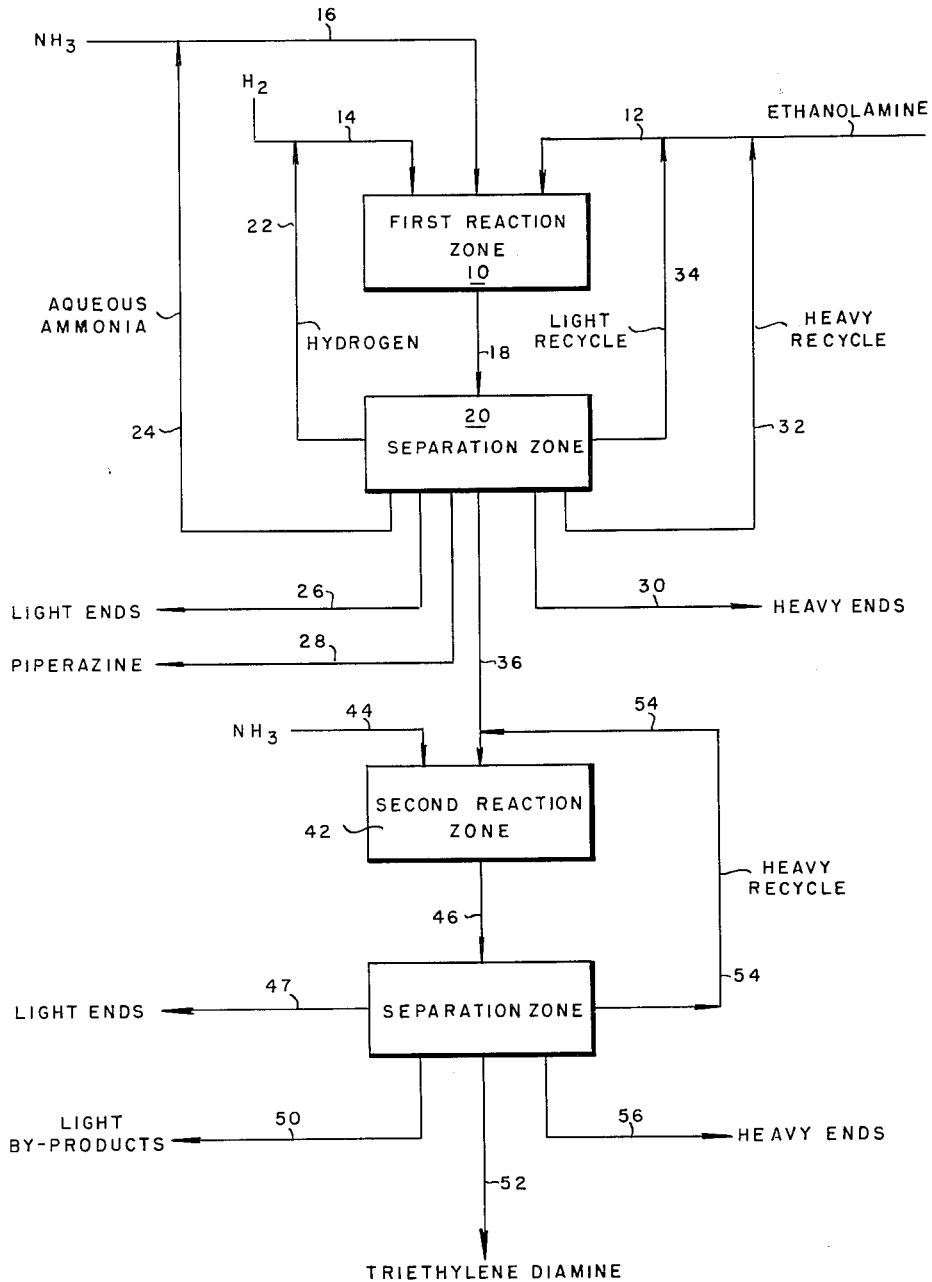

3,231,573
SELECTIVE PRODUCTION OF TRIETHYLENEDI-
AMINE FROM IMPURE FEED STOCKS
Walter H. Brader, Jr., and Thomas H. Cour, Austin, Tex.,
assignors to Jefferson Chemical Company, Inc., Houston, Tex., a corporation of Delaware
Filed May 9, 1962, Ser. No. 193,491
3 Claims. (Cl. 260—268)

This invention relates to a process for the production of a heterocyclic amine in good yield from an impure feed stock. More particularly, this invention relates to a process for the production of 1,4-diazabicyclo-(2.2.2)-octane (hereinafter referred to as triethylenediamine) from a feed stock comprising a mixture of heterocyclic and alicyclic ethylenic amines.

This invention is a continuation-in-part of our co-pending application Serial No. 111,025, filed May 18, 1961, now abandoned and entitled "Selective Production of Heterocyclic Amine."

It has heretofore been proposed to prepare triethylenediamine from a variety of feed stocks. Thus, for example, Herrick U.S. Patent No. 2,937,176 discloses a process for the production of triethylenediamine from alicyclic amines such as diethylenetriamine, triethylene-tetramine, etc. Krause U.S. Patent No. 2,985,658 discloses a process for the preparation of triethylenediamine from N-aminoethylpiperazine.

As illustrated by the foregoing and similar publications, it has heretofore been the practice to use comparatively pure feed stocks in the production of triethylenediamine. This is readily understood when the nature of the synthesis involved is considered. Thus, as is demonstrated by the publications, comparatively severe catalytic conditions are required for the production of triethylenediamine. Therefore, under even the best of conditions, the cyclization reactions leading to triethylenediamine are notoriously non-selective and the catalysts that are employed promote not only the desired cyclization reactions, but also a wide variety of side reactions, including cracking reactions and condensation reactions that lead ultimately to the formation of a wide variety of acyclic or heterocyclic by-products. As a consequence, a bicyclic compound such as triethylenediamine will normally appear in the liquid amine products of such a reaction, even under the best of circumstances, as a minor component of the reaction mixture, comprising less than about 30 wt. percent. Expensive and complicated purification methods are therefore required to recover triethylenediamine from the crude reaction mixture because of its complex nature. As a consequence of the foregoing and related reasons, it has heretofore been deemed that the feed stock should be pure in order to minimize by-product formation and recovery problems.

In contrast to the foregoing, it has now been discovered, covered, in accordance with the present inventiton, that an impure feed stock can be used for preparation of triesthylenediamine, as hereinafter defined, provided that the catalyst that is employed is an acidic silica-alumina catalyst, and further provided that the synthesis is conducted in the presence of from about 1 to about 10 mol equivalents of added ammonia per mol equivalent of starting material under the reaction conditions hereafter defined.

The feed stocks that may be employed in accordance with the present invention boil within the range of about 180° to about 250° C. and comprise from about 50 to about 80 wt. percent of N-aminoethylpiperazine and from about 10 to about 30 wt. percent of hydroxyethylpiperazine, diethylenetriamine and aminoethylethanolamine, the balance being higher boiling condensation products derived from the above-mentioned amines. For example, a representative feed stock will comprise 50 to 75 wt. percent of N-aminoethylpiperazine, 5 to 15 wt. percent of hydroxyethylpiperazine, about 5 to 15 wt. percent of diethylenetriamine and 1 to 5 wt. percent of aminoethylethanolamine.

A suitable method for the preparation of a feed stock for the present invention which comprises a crude mixture as above defined and which boils within the range of about 180° to about 250° C. is disclosed, for example, in co-pending application Serial No. 111,016, filed May 18, 1961, in the name of Mulbauer et al., and entitled, "Combination Process." Thus, as is disclosed in the said co-pending application, a suitable aliphatic feed stock such as an ethanolamine is brought into contact with a hydrogenation catalyst under reductive amination conditions including, for example, a temperature within the range of about 150° to about 400° C., a pressure within the range of about 20 to about 400 atmospheres, including a hydrogen partial pressure within the range of about 20 to about 200 atmospheres, the reaction preferably being conducted in the presence of 1 to 10 mols of added ammonia per mol equivalent of feed stock and in the additional presence of from about 0 to about 100 wt. percent of water, based on the feed stock. The space velocity for continuous operations will suitably be within the range of about 0.1 to about three pounds of total feed stock per hour per pound of catalyst.

The catalyst to be employed should be a hydrogenation catalyst, such as a metal hydrogenation catalyst comprising one or more of the metals from the group including copper, nickel, cobalt, platinum, palladium or rhodium. Oxides of such metals may be employed and the metals may be utilized in admixture and, if desired, promoted with a minor amount of an oxide which is non-reducible under the amination conditions employed, such as an oxide selected from the group consisting of chromium oxide, molybdenum oxide, manganese oxide, thorium oxide, rare earth oxides and mixtures thereof. A particularly effective group of catalysts are those derived from the oxides of chromium, copper and nickel or cobalt, having the composition calculated in mol percent on an oxide-free basis of 60% to 85% nickel or cobalt, 14% to 37% copper and 1% to 5% chromium, with the preferred composition being 72% to 75% nickel, 20% to 25% copper and 1% to 3% chromium. Such a mixed hydrogenation catalyst may be employed initially in the form of oxides of the nickel or cobalt and copper and chromium, but the nickel or cobalt and copper will normally be reduced to a metallic condition during the course of the reaction. However, chromium oxide will normally remain as chromium oxide, not as metallic chromium.

The products formed by the above process are suitably separated in a fractionation zone of any desired construction, such as a distillation train, into a plurality of fractions, including a crude fraction boiling within the range of about 180° to about 250° C. and having a composition as set forth above; such crude fraction being a feed stock for the present invention.

In accordance with the present invention, a feed stock boiling within the range of about 180° to about 250° C., as above defined, is brought into contact with an acidic silica-alumina catalyst under conversion conditions, as hereinafter set forth, to provide a reaction mixture containing an enhanced amount of triethylenediamine.

By way of example, the solid acidic cracking catalyst may be a silica-alumina cracking catalyst containing from about 60 to about 95 wt. percent silica, and correspondingly, from about 40 to about 5 wt. percent of alumina. Such a catalyst may also contain minor quantities of conventional modifiers or stabilizers such as alkaline earth metal oxides, alkali metal oxides, zirconia, etc.

The process of the present invention is a vapor phase process which is preferably conducted at atmospheric pressure. Pressures above atmospheric pressure or below atmospheric pressure may also be employed, such as pressures within the range of about 0.1 p.s.i.a. to about 150 p.s.i.g. The reaction temperature is preferably within the range of about 220° to about 500° C. and is at least sufficient to maintain the feed stock components in vapor phase.

In accordance with the present invention, from about 0.05 to about 5 pounds per hour of ammonia per pound of feed stock is also charged to the conversion zone. On a mol basis this corresponds roughly to about 1 to about 10 mols of ammonia per mol equivalent of feed stock components.

The space velocity to be employed is suitably within the range of about 0.1 to about 5.0 pounds of feed stock per hour per pound of catalyst.

The reaction product that is formed as a result of the contacting step is separated in a suitable separation zone, such as a combination fractional distillation-crystallization zone, into a plurality of fractions, including a purified triethylenediamine fraction.

The yields of triethylenediamine that are obtained through the practice of the process of the present invention will normally be within the range of about 20% to about 30%, based on the feed stock, which is exceedingly surprising when due consideration is given to the crude nature of the feed stock employed.

The invention will be further illustrated with respect to the accompanying drawing wherein the single figure is a schematic flow sheet illustrating a preferred continuous method for the practice of the process of the present invention.

Turning now to the flow sheet, there is shown a first reaction zone 10 for the preparation of aminoethyl-piperazine to be utilized in accordance with the process of the present invention. It will be understood, of course, that the process to be described is a preferred method for preparing the crude feed stock of the present invention, but that the process of the present invention can be operated with crude aminoethylpiperazine obtained from any suitable source (not shown).

In accordance with this preferred embodiment of the present invention, an aliphatic amine such as mono-ethanolamine, diethanolamine or triethanolamine is charged to a first zone 10 by way of a charge line 12. Hydrogen is charged by way of a line 14 and ammonia is charged by way of a line 16.

The first reaction zone 10 will contain a suitable hydrogenation catalyst, such as, for example, a nickel-copper-chromium oxide catalyst containing, on an oxide-free basis, from about 60 to about 85 wt. percent nickel, from about 14 to about 37 wt. percent copper and from about 1 to about 5 wt. percent chromium oxide. The ethanolamine is converted under the reaction conditions set forth above.

The products from the first reaction zone 10 are discharged by way of a line 18 leading to a separation zone 20 of any suitable construction, such as a zone constructed and operated in the manner described in the said co-pending application Serial No. 111,016 entitled "Combination Process." As is there disclosed in greater detail, the reductive amination products are separated into a light hydrogen fraction 22 which is preferably recycled to hydrogen charge line 14, and aqueous ammonia fraction 24 which is preferably recycled to ammonia charge line 16, a light ends fraction 26 which is preferably discarded, a piperazine fraction 28 which is a suitable product fraction, a heavy ends fraction 30 which is preferably discarded, a heavy recycle fraction 32 which is preferably recycled to charge line 12 and a light recycle fraction 34 which is preferably recycled to charge line 12.

There is also obtained a crude aminoethylpiperazine fraction 36 boiling within the range of about 180° to about 250° C. and containing from about 50 to about 75 wt. percent aminoethylpiperazine which is suitable for use as a feed stock of the present invention.

The crude aminoethylpiperazine, from whatever source derived, is charged by way of a line 36 to a second reaction zone 42 containing a silica-alumina catalyst. Ammonia is charged to the second reaction zone 42 by way of an ammonia charge line 44 whereby the ammonia and crude aminoethylpiperazine feed stock is contacted with the catalyst under vapor phase conditions, as described above, to convert a significant portion of the feed components into triethylenediamine.

The crude triethylenediamine-containing reaction product is discharged from zone 42 by way of a line 46 leading to a separation zone 48 of any suitable construction. Thus, a separation system as disclosed in said co-pending application Serial No. 111,016, entiled, "Combination Process," and co-assigned application Serial No. 111,021, filed of an even date and entitled, "Purification of Amines," may be employed.

In accordance wth this system, wherein both distillation and crystallization are employed, the crude reaction product 46 is separated into a light ends fraction 47 comprising water, normally gaseous reaction products and waten azeotroping amines, such as N-methylpiperazine, etc. The fraction 47 may be discarded or treated in a suitable zone (not shown) for the recovery of ammonia or other components thereof for recycle.

A light distillate piperazine fraction 50 is also obtained which boils within the range of about 130° to about 160° C.

Triethylenediamine is recovered by way of a line 52 and a heavy distillate containing unreacted aminoethyl-piperazine obtained by way of a line 54 and is preferably recycled to the line 36. A heavy bottoms fraction obtained by way of a line 56 is preferably discarded from this system.

The invention will be further illustrated with respect to the following specific examples which are given by way of illustration and not as limitations on the scope of this invention.

The work described in the examples was carried out in a unit which consisted of a feed tank, feed pump preheater, reactor, cooler and product receiver. A Hills-McCanna positive displacement pump discharged feed to a Dowtherm heated preheater. Vaporized feed from the preheater entered the top of the reactor and was mixed with ammonia vapor (when ammonia was used) before contacting the catalyst. The reactor was a jacketed 1½ inch tube packed with silica-alumina catalyst to a height of about 5 feet. This provides an $L/D$ ratio of about 40. The reactor was heated with Dowtherm jacket equipped with a natural convection circulation system. Reactor effluent was cooled with a jacket-type water cooler and collected in a vented glass bottle.

The reactor in question contained about 2.4 pounds of a commercial silica-alumina catalyst containing about 86 wt. percent of silica and about 12 wt. percent of alumina.

EXAMPLE I

The feed stock for this example was an impure feed stock boiling within the range of about 180° to about 250° C. obtained by distillation from the products formed by the catalytic reductive amination of monoethanolamine and contained about 61% aminoethylpiperazine, about 10% hydroxyethylpiperazine, about 10% diethylenetriamine, the remainder being a minor amount of aminoethylethanolamine and higher boiling condensation products.

The feed stock was charged to the reactor at the rate of about 2.2±0.07 pounds per hour per pound of catalyst at a reaction temperature of about 375° C. Stated differently, the feed stock was passed through the tubular reactor at a temperature of about 375° C. and a space velocity of about 2.04 pounds of feed per hour per pound of catalyst. The reactor effluent was passed through a cooler, collected in a vented container and analyzed. The results that were obtained are as follows:

|  | Yields, wt. percent based on total feed charged |
|---|---|
| Triethylenediamine | 20.8 |
| Piperazine | 10.2 |
| Residue | 21.1 |
| Methyl and ethylpiperazine | 8.4 |

EXAMPLE II

Example I was repeated except that ammonia was used as a co-reactant at a feed rate of about 0.1 pound per hour per pound of feed stock. The results that were obtained are as follows:

|  | Yields, wt. percent based on total feed charged |
|---|---|
| Triethylenediamine | 26.0 |
| iPperazine | 11.0 |
| Residue | 15.5 |
| Methyl and ethylpiperazine | 7.4 |

EXAMPLE III

This run was made at 375° C. and a space velocity of 1.2 pounds of impure feed per hour per pound of catalyst and an ammonia rate of 0.1 pound per hour per pound of catalyst.

|  | Yields, wt. percent based on total feed charged |
|---|---|
| Triethylenediamine | 25.2 |
| Piperazine | 9.6 |
| Residue | 19.6 |
| Methyl and ethylpiperazine | 7.6 |

From the foregoing results it is seen that the use of added ammonia under the recited conversion conditions of the present invention gave unexpected results. Thus, it will be seen that with added ammonia the quantity of heavy residue that was produced was significantly reduced and that the amount of triethylenediamine that was produced was significantly increased by about an equivalent amount. In other words, the composition of the crude reaction product was significantly altered in that residue formation was decreased and the feed component that would normally have been converted to residue were, instead, converted to the desired product, triethylenediamine. These results are entirely unexpected inasmuch as it would not be expected that the crude feed stock of the present invention would contain components which appear to act synergistically upon each other in order to more selectively produce triethylenediamine. It would normally be expected that such a crude reaction mixture would increase rather than decrease the amount of residue that is obtained.

Also, in contrast to the foregoing results, the use of added ammonia does not provide significant improvement when the feed stock is substantially pure N-aminoethylpiperazine. This is shown by the following examples.

EXAMPLE IV

In this example, substantially pure N-aminoethylpiperazine was fed at a rate of 2.2±0.07 pounds per hour per pound of catalyst at a reaction temperature of 375° C. The conversion of aminoethylpiperazine was 99.6%. The yields below are weight yields—pounds per pound of aminoethylpiperazine charged or unconverted.

|  | Yields, percent based on aminoethylpiperazine | |
|---|---|---|
|  | Charged | Converted |
| Triethylenediamine | 24.4 | 24.5 |
| Piperazine | 12.2 | 12.2 |
| Residue | 21.7 | 21.8 |
| Methyl and ethylpiperazine | 6.8 | 6.8 |
| Others (heavies) | 12.6 | 13.0 |

EXAMPLE V

Example IV above was repeated except that 0.1 pound of ammonia per pound of aminoethylpiperazine was used as feed stock. The yields were calculated on the same basis in this example (and succeeding ones) as used in Example I.

|  | Yields, percent based on aminoethylpiperazine | |
|---|---|---|
|  | Charged | Converted |
| Triethylenediamine | 22.7 | 28.1 |
| Piperazine | 12.6 | 12.8 |
| Residue | 19.1 | 19.3 |
| Methyl and ethylpiperazine | 8.8 | 8.9 |
| Others (heavies) | 12.3 | 12.4 |

Having thus described our invention, what is claimed is:

1. A method for preparing triethylenediamine which comprises bringing a feed stock boiling within the range of 180° to 250° C. comprising impure aminoethylpiperazine into contact with a silica-alumina catalyst at a pressure within the range of 0.1 p.s.i.a. to about 150 p.s.i.g. at a temperature within the range of about 220° to about 500° C. at least sufficient to maintain said feed stock in vapor phase in the added presence of about 1 to about 10 mols of ammonia per mol of feed stock for a space velocity within the range of about 0.1 to about 5 pounds per hour per pound of catalyst to thereby provide a reaction product containing triethylenediamine and recovering said triethylenediamine from said reaction product, said feed stock containing about 50 to about 75 wt. percent of aminoethylpiperazine and from about 10 to about 30 wt. percent of impurities comprising diethylenetriamine, aminoethylethanolamine and hydroxyethylpiperazine.

2. A method as in claim 1 wherein the catalyst contains from about 60 to about 90 wt. percent silica and, correspondingly, from about 40 to about 5 wt. percent of alumina.

3. A method for preparing triethylenediamine which comprises bringing a feed stock boiling within the range of 180° to 250° C. comprising impure aminoethylpiperazine into contact with a silica-alumina catalyst at a pressure within the range of 0.1 p.s.i.a. to about 150 p.s.i.g. at a temperature within the range of about 220° to about 500° C., at least sufficient to maintain said feed stock in vapor phase in the added presence of about 1 to about 10 mols of ammonia per mol of feed stock for a space velocity within the range of about 0.1 to about 5 pounds per hour per pound of catalyst to thereby provide a reaction product containing triethylenediamine and recovering said triethylenediamine from said reaction product, said feed stock boiling within the range of about 180° to about 250° C. and comprising from 50 to 75 wt. percent of N-aminoethylpiperazine, 5 to 15 wt. percent of hydroxyethylpiperazine, 5 to 15 wt. percent of diethylenetriamine and 1 to 5 wt. percent of aminoethylethanolamine.

References Cited by the Examiner
UNITED STATES PATENTS

| | | | |
|---|---|---|---|
| 2,937,176 | 5/1960 | Herrick | 260—268 |
| 2,977,363 | 3/1961 | Farkas et al. | 260—268 |
| 2,977,364 | 3/1961 | Mascioli | 260—268 |
| 2,985,658 | 5/1961 | Krause | 260—268 |
| 3,148,190 | 8/1964 | Swanson | 260—568 |

OTHER REFERENCES

Ishiguro et al., Journal Pharm. Soc. Japan, vol. 75, pp. 1370–1373 (1955).

NICHOLAS S. RIZZO, *Primary Examiner.*

IRVING MARCUS, *Examiner.*